United States Patent
Jangaard

[11] 3,710,498
[45] Jan. 16, 1973

[54] PURSE RING STRIPPER AND STRIPPING METHOD

[75] Inventor: Sverre M. Jangaard, San Diego, Calif.

[73] Assignee: Campbell Industries, San Diego, Calif.

[22] Filed: Sept. 1, 1971

[21] Appl. No.: 177,069

[52] U.S. Cl. .................... 43/4.5, 43/8, 43/14
[51] Int. Cl. .............................. A01k 73/12
[58] Field of Search ................... 43/4.5, 8, 14

[56] References Cited

UNITED STATES PATENTS

| | | | |
|---|---|---|---|
| 3,638,345 | 2/1972 | Whaley | 43/8 |
| 3,481,065 | 12/1969 | Whaley | 43/4.5 |
| 1,390,006 | 9/1921 | Akre | 43/8 |
| 3,626,625 | 12/1971 | Whaley | 43/8 |

*Primary Examiner*—Louis G. Mancene
*Attorney*—Filwider, Patton, Reiber, Lee & Utecht

[57] ABSTRACT

A purse ring stripper and stripper method which facilitate stripping a closely grouped plurality of purse rings from a loop of purse line used in a purse seining operation for catching fish. The stripper is adapted to be suspended adjacent the loop of purse line for swinging movement, and includes an elongated threading portion for detachable coupling to the purse line outwardly of the group of purse rings. When the adjacent portion of the purse line loop is slacked off, the suspended stripper and rings move relative to one another and thread the threading portion through the rings. The rings slide over the threading portion and collect upon the stripper where they are supported for later separation of the purse line from the purse rings. The rings are subsequently automatically sequentially slid off the stripper when the net is hauled in. This method eliminates hoisting of the purse rings high above the fishing vessel for placement upon the deck or upon a pole or other collection device fixed to the vessel. In one embodiment the stripper is lowered generally simultaneously with slacking of one side of the purse line loop to facilitate transfer of the rings onto the stripper.

12 Claims, 9 Drawing Figures

INVENTOR.
SVERRE M. JANGAARD

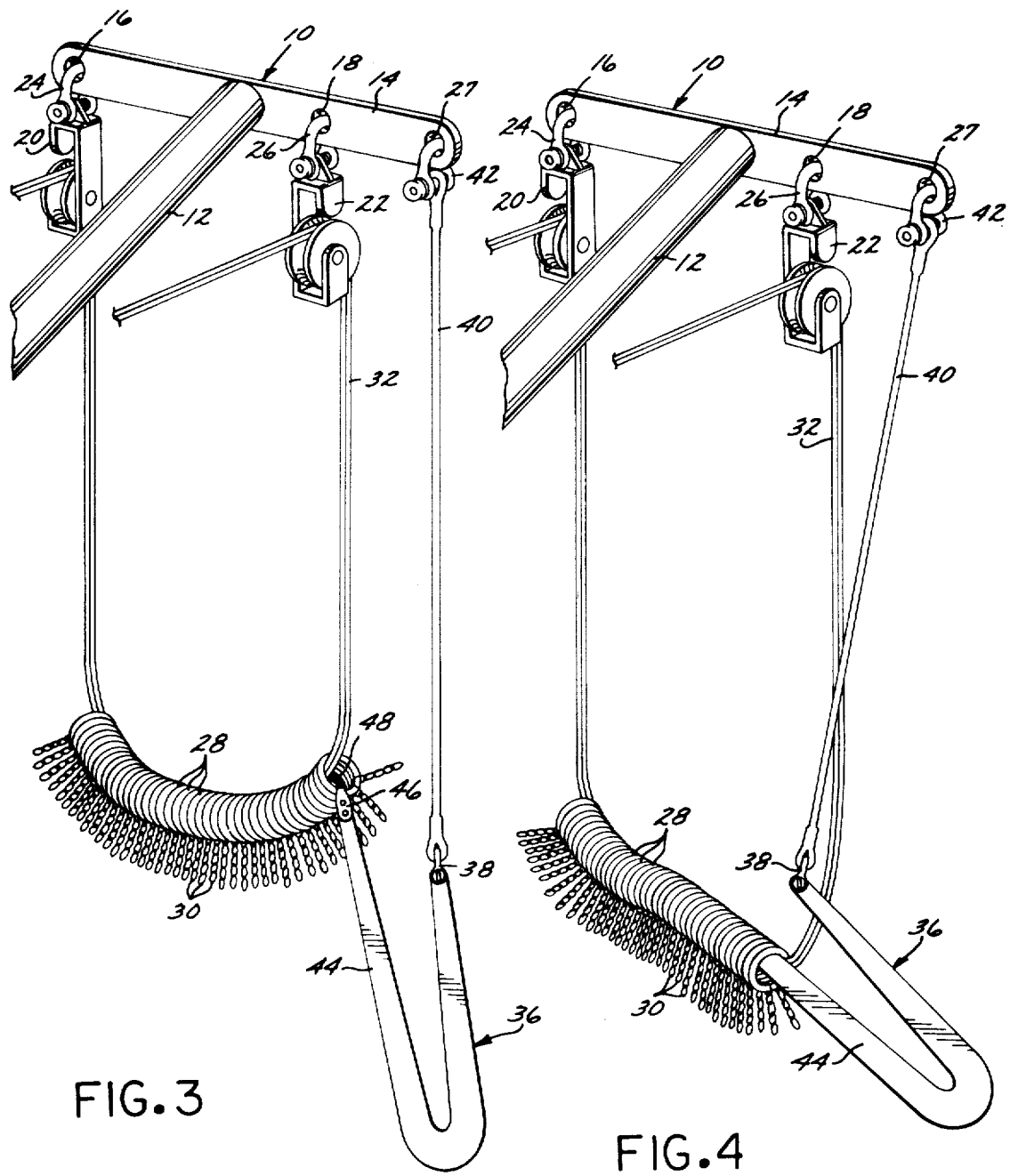

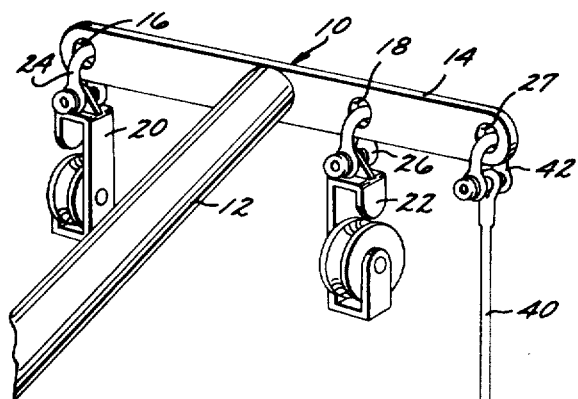
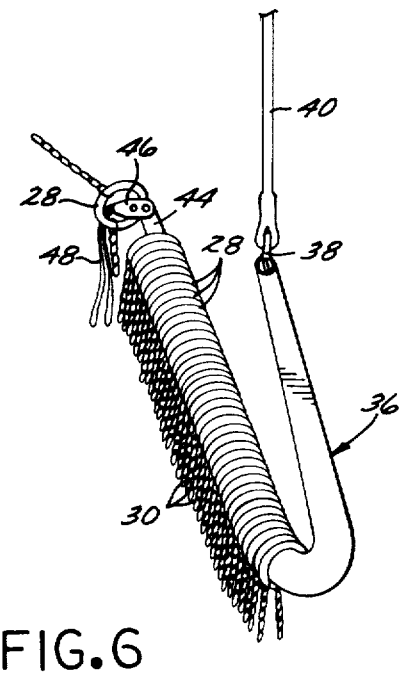
FIG.6
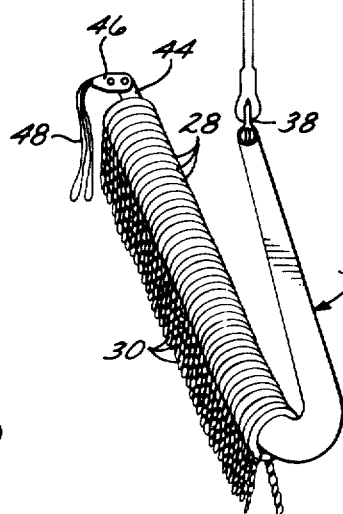
FIG.5
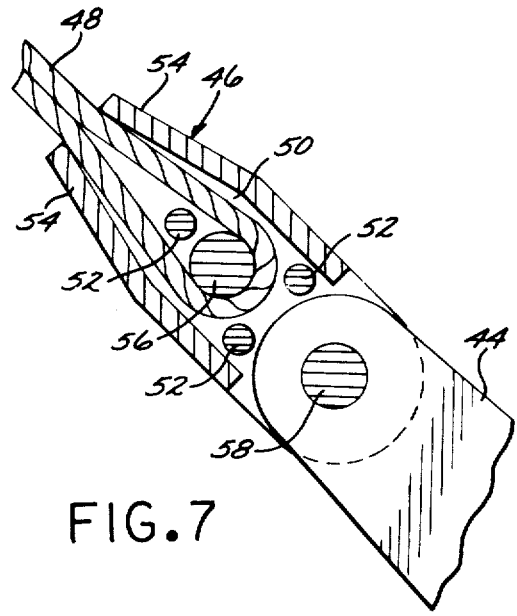
FIG.7
INVENTOR.
SVERRE M. JANGAARD

INVENTOR.
SVERRE M. JANGAARD
ATTORNEYS

PURSE RING STRIPPER AND STRIPPING METHOD

BACKGROUND OF THE INVENTION

1. Field of the Invention

The present invention relates to purse ring stripping in a purse seine operation for catching fish.

Description of the Prior Art

It is now common practice in catching tuna and similar fish to utilize a purse seine or net which is set or deployed about the school of fish and subsequently winched up to the fishing vessel to concentrate the fish in a small area. The seine may range up to 800 fathoms in length and 50 fathoms in depth. Floats are attached at the top to buoy the seine, and chain or like weights are attached at the bottom to weight and vertically orient the seine.

The bottom of the seine includes a plurality of purse rings disposed at uniform intervals along the bottom edge of the seine and coupled to the seine by suitable bridles. A purse line passes through these rings so that when the seine is deployed or set in position around the school of fish, the purse line can be hauled in to draw the rings close together and thereby purse or close the bottom of the seine to trap the fish.

In one prior art procedure the purse line is hauled in until all of the purse rings are brought together and hoisted clear of the water to a height of approximately 15 feet to clear the vessel rail. The rings are lowered to the deck in a clear area for separation into groups and for removal of the purse line. Each group is tied with retaining chains to some part of the vessel to prevent them from being dragged back into the water by the weight of the net and the captured fish. With this procedure when the net is hauled in the rings in each group have to be released by hand so that they will be properly successively released for drawing up with the rest of the net as it passes over the hoisting block. Such manual handling of the net and heavy rings is a time consuming and very hazardous operation.

Another technique used in the prior art, and particularly described in U. S. Pat. No. 3,481,065, issued Dec. 2, 1969, also requires that the loop of purse line and collected purse rings be hoisted up and high above the surface of the water. More particularly, the purse line and rings are hoisted high enough to attach a clamp to the purse line to take the load off the line. One end of the purse line loop is then disconnected from its winch and fixed to a collection hook or pole attached to the side of the vessel. The clamp is then removed, again placing the weight of the grouped purse rings on the purse line. The purse line must next be hauled high in the air so as to raise the lower portion of the loop of purse line enough above the upper end of the hook or pole to enable the rings to slide onto the hook or pole.

These and the other purse stripping techniques of the prior art thus require use of heavy tackle to hoist the purse rings to a height sufficient to either transfer them to the deck, or thread them onto the hook or pole, as the case may be. Moreover, they are undesirably tedious and time consuming.

SUMMARY

According to the present invention a purse ring stripper and method are provided which eliminate any need for heavy tackle to hoist the purse rings, and eliminate any necessity for fixedly holding an end of the pursing line in order to effect collection of the rings upon the ring stripper. Instead, the loop of purse line is left free to move through the purse rings. An elongated threading portion of the present purse ring stripper is then detachably coupled to the purse line and is carried by the purse line through the plurality of rings bunched on the purse line. More particularly, once the pursing operation is completed and the grouped purse rings are suspended in a loop of purse line between the usual forward and rearward purse blocks, the present purse stripper is suspended adjacent the loop for swinging movement. The outer end of the elongated threading portion of the purse stripper is shackled or otherwise coupled to the purse line at a point outwardly of the bunched purse rings. Next, one side of the loop is slacked off to effect relative movement between the rings and the threading portion of the stripper to pass it through the purse rings with the purse line. The purse rings slide onto and collect upon the purse stripper, and the configuration and weight balance of the suspended stripper enable it to retain and support the collected rings. The purse line can then be disconnected to ready the rings for sequential separation or stripping when the net is hauled in. In a preferred embodiment the stripper is supported so that it can be lowered generally simultaneously with the slacking of the purse line. This enables the rings to slide onto the stripper more easily and allows the transfer to even take place below water level.

The present stripper and method do not require that the purse line be hoisted any higher than the pursing davit which supports the purse blocks and, in fact, not much higher than the water surface. This is because the suspended purse stripper is free to move into alignment with the rings as the rings and purse line move relative to one another. The purse line need not be temporarily disconnected from its winch and then fixedly attached to the stripper, as in the stripper of the previously mentioned apparatus of U. S. Pat. No. 3,481,065, but is wholly different in that it depends upon freedom of movement of the purse line and stripper to thread the stripper through the purse rings. In fact, threading can take place under water in one embodiment of the invention, which reduces strain on the operating gear because of the relative buoyancy of the rings, purse line, and stripper in water. Moreover, there is no necessity for hauling the rings onto the vessel deck for attachment of retaining chains or the like. Thus, the present stripping method is rapid, non-hazardous, and readily adapted for use on purse seining vessels without substantial modification of such vessels.

Other objects and features of the invention will become apparent from consideration of the following description taken in connection with the accompanying drawings.

BRIEF DESCRIPTION OF THE DRAWINGS

FIG. 3 is a view identical to FIG. 2 and illustrating the initial relative movement between the rings and the purse line as the purse line adjacent the purse line loop is slacked off;

FIG. 4 is a view identical to FIG. 3, illustrating the rings sliding onto the stripper member as the slacking off continues;

FIG. 5 is a perspective view of the purse stripper and the purse rings collected thereon after removal of the purse line;

FIG. 6 is a perspective view of the purse ring stripper of FIG. 5, showing the rings being sequentially stripped off the stripper as the net is hauled in;

FIG. 7 is a longitudinal cross sectional view of the outer extremity of the purse ring stripper;

DESCRIPTION OF THE PREFERRED EMBODIMENT

Figures 1, 2:
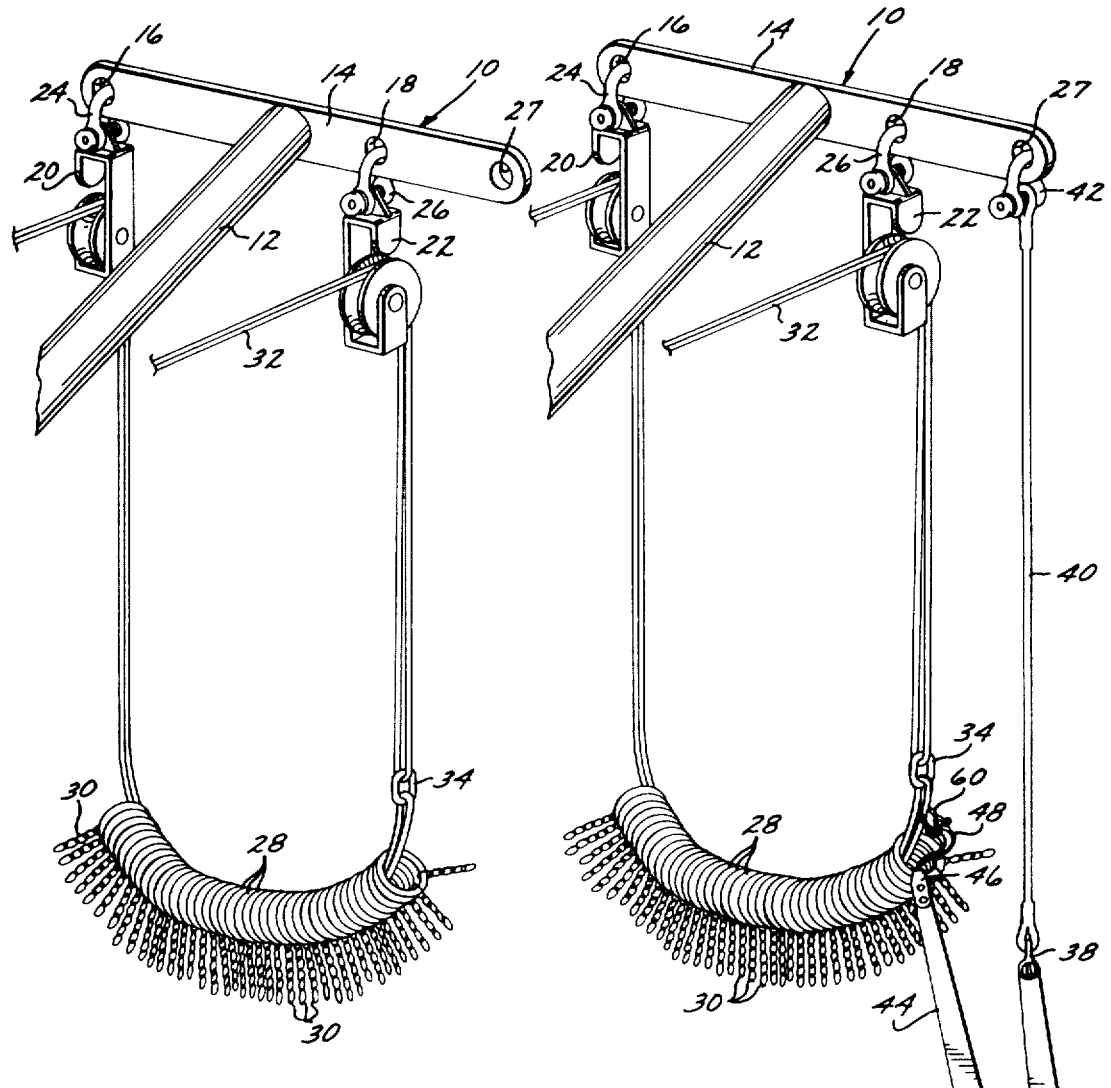
FIG. 1 is a perspective view of a conventional pursing davit, the forward and stern pursing blocks suspended from the davit, and a closely grouped plurality of purse rings collected upon the loop of purse line between the blocks.
FIG. 2 is a view identical to FIG. 1 except that a purse ring stripper according to the present invention is suspended adjacent the purse line loop.

Referring now to the drawings, and particularly to FIG. 1, there is illustrated the conventional type of equipment utilized in a purse seining operation. The equipment includes a pursing davit 10 comprised of heavy steel pipe 12 fixed at its lower extremity to an appropriate bearing support (not shown) mounted to the port rail of the vessel (not shown). The pipe 12 extends diagonally upwardly and outwardly, and a heavy steel plate 14 is welded to the outboard end of the pipe 12 in a T configuration. The plate 14 is provided with a pair of openings or hanger eyes 16 and 18 for attachment of a stern purse block 20 and a forward purse block 22, respectively, by means of usual shackles 24 and 26. The forward end of the plate 14 also includes a third opening or hanger eye 27 for a purpose which will be described.

As previously indicated the usual net or purse seine includes a plurality of purse rings 28 located at uniform intervals along the bottom edge of the seine and attached thereto by suitable chain bridles 30. A purse line 32 is disposed through the rings 28 so that when it is tightened or pursed the bottom of the seine is closed to trap the fish. One end of the line 32 is made up with a loop commonly 3 fathoms in length, which is provided to better withstand the wear of the rings 28 when the line 32 is being pursed. This double cable is seen in most of the drawings and constitutes the purse line 32 herein referred to.

When the purse line 32 is drawn in enough to fully close or purse the net, the rings 28 will be suspended below the davit 10 in a loop of the purse line, as shown in FIG. 1. This loop is typically approximately 2 fathoms in length. The opposite ends of the purse line are trained about the purse blocks 20 and 22 and extend to a pair of pursing drums (not shown) associated with a suitable winch (not shown). The purse line includes one or more connecting links 34 to receive the spliced cable loops forming a part of the purse line 32. When the purse line 32 is drawn in as illustrated, one link 34 is located adjacent the forward purse block 22. As will be seen, it is next to this link that a purse ring stripper 36 is detachably coupled to the purse line 32.

Referring now to FIGS. 2-6, the stripper 36 is generally U-shape in configuration, comprising an elongated, generally vertically oriented leg or extremity pivotally mounting a shackle 38 for attachment of the stripper 36 to the lower end of a cable or sling 40. The upper end of the sling is connected by a similar shackle 42 to the davit hanger eye 27. Thus, the connection of the stripper 36 to the davit is flexible, the stripper 36 is freely hanging or free to swing and otherwise move, and consequently any strain on the stripper 36 is transmitted to the davit 10 as a pull upon the sling 40.

The stripper 36 also includes an opposite leg or free extremity extending diagonally outwardly and upwardly and constituting a threading or stripper portion 44. The stripper 36 is freely hung or suspended in a position such that the stripper portion 44 is located adjacent the loop of purse line 32 and slightly below the rings 28. The suspended mounting of the stripper 36 enables the stripper portion 44 not only to swing in a generally vertical plane, but also to rotate with the stripper about a generally vertical axis. This facilitates proper orientation of the stripper portion 44 relative to the rings 28, as will be seen.

The outer end of the stripper portion 44 pivotally carries a coupler 46 which receives the ends of a pair of loops of cables 48, only one of which is illustrated in FIG. 7. The cables 48 enable detachable coupling of the stripper 36 to the adjacent extremity of the loop of the purse line 32, next to the connection link 34, as best illustrated in FIG. 2. The coupler 46 is made up of a pair of spaced apart side plates 50 which are secured together by removable fasteners, such as socket head cap screws 52, the openings between the edges of the plates 50 being closed by a pair of edge members 54 welded to adjacent portions of the confronting plates 50.

The coupler 46 also includes a transversely disposed cylindrical post 56 having reduced diameter end portions carried in the confronting plates 50. The end loops of the pair of cables are trained about the larger diameter portion between the plates 50. A similar member 58 is disposed between the adjacent extremities of the coupler 46 and the stripper portion 44 and serves as a bearing, providing a pivotal connection between the two.

The end of one loop of cable 48 is coupled by a usual shackle to one end of a length of chain 60 and the opposite end of the chain 60 is secured by a similar shackle to the end of the other loop of cable 48. As will be apparent, one of the shackles can be opened to pass the chain through the loop of purse line next to the link 34, as best seen in FIG. 2. The flexible connection afforded by the cables 48, chain 60, and coupler 46 makes possible easy transfer of the purse rings 28 from the purse line 32 to the stripper 36.

The configuration and the distribution of weight of the stripper 36 is made such that the purse rings 28 can be collected upon and supported by the stripper 36 without sliding off, as seen in FIG. 6. The weight of the rings and the associated bridles 30 and net material acts to maintain the stripper portion 44 in the angular, outwardly and upwardly projected position illustrated, even when the purse line 32 is removed from the rings.

In operation, the present method of stripping the closely grouped plurality of purse rings 28 from the loop of purse line 32 is suspended between the pair of purse blocks 20 and 22 comprises the steps of freely suspending the stripper 36 adjacent the purse ring loop in the manner previously described. This enables the stripper to swing in a generally vertical plane, and about the axis of the suspending sling 40, and otherwise align the stripper coupler 46 with the openings in the purse rings 28.

After the net is fully pursed, the rings 28 hang or are suspended beneath the davit 10. The chain 60 of the coupler 46 is passed through and shackled to the loop of the purse line 32 adjacent the connecting link 34, the point of connection thus being located outwardly of all of the purse rings 28. Next, the forward or front end of the purse line 32, that is, the end of the purse line located on the side of the purse line loop adjacent the stripper 36, is slacked off by operation of the associated winch. Although the operation may also include the step of simultaneously hauling in the opposite end of the purse line, this is usually not necessary if the end of the coupler 46 is located sufficiently below the purse line loop. If it is, slacking the loop drops all of the rings onto the coupler 46, as seen in FIG. 4. During this step, the stripper side of the purse line loop first drops about 2 to 3 feet, and at the same time the coupler 46 aligns itself with the opening in the end one of the assembled rings 28, as best viewed in FIG 3. An instant later, as seen in FIG. 4, the flexible coupler 46, cables 48 and chain 60 pass through all of the suspended purse rings 28 and allow the weight of the rings to shift the rings downwardly onto the portion 44.

This combined alignment with the rings of the stripper portion 44, slacking off of the purse line 32 through the forward block 22, and flexible threading of the coupler 46, cables 48 and chain 60 through the rings 28 completely eliminates any necessity for hoisting the rings 28 to any appreciable height, and also eliminates any need to temporarily disconnect the purse line 32 from the pursing drums.

The lengths or dimensions selected for the sling 40 and the opposite legs of the U-shaped stripper 36 will vary according to the particular number and size of purse rings being handled, and the sizes and relative locations illustrated are therefore merely exemplary.

With reference to FIG. 5, after all of the purse rings 28 are collected upon and supported by the stripper portion 44, the chain 60 of the coupler 46 is unshackled from the purse line loop, and the purse line 32 is then removed or separated from the purse rings in the conventional manner, leaving the purse rings 28 collected upon the stripper 36.

The net is then hauled in by training it about the usual power block on the seine boom. As the net passes through the power block the bridles 30 attached to the lower edge of the seine sequentially pull or strip the purse rings 28 off the stripper 36, as best illustrated in FIG. 6.

Figures 8, 9:
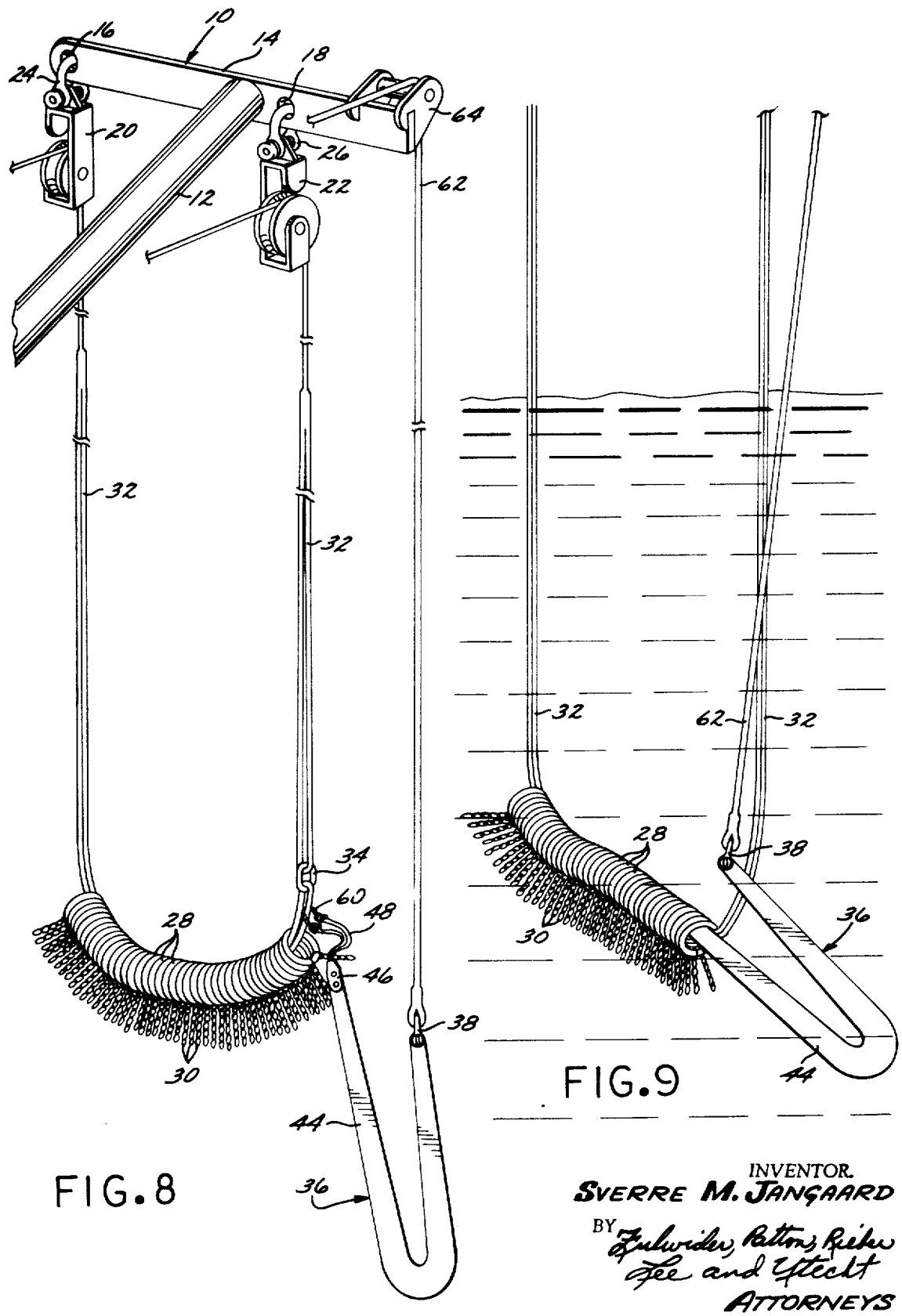
FIG. 8 is a perspective view similar to FIG. 1, but illustrating a second embodiment in which the stripper is adapted to be lowered relative to the davit.
FIG. 9 is a partial perspective view of the arrangement of FIG. 8, but illustrating the purse line loop and stripper below the water line after both have been slacked off.

Referring now to FIGS. 8 and 9, there is illustrated a preferred embodiment of the present invention which is substantially similar to that previously described, except that the stripper 36 is not supported to the davit 10 by the sling 40, but is instead supported by a line 62 which passes over a block 64 comprised of a roller supported upon a pair of cheek blocks welded to the davit plate 14.

This enables the stripper 36 to be lowered at approximately the same time as the step of slacking off the adjacent end of the purse line loop. Coordination of the lowering of the purse line loop and the lowering of the stripper 36 allows the purse rings 28 to more easily be transferred to the stripper threading portion 44. In fact, the purse line loop and line 62 can both be slacked until the rings 28 and stripper 36 drop below the surface of the water adjacent the vessel, as best viewed in FIG. 9, with the stripper 36 still being below the position of the purse rings 28. Heaving on the purse line to effect transfer of the purse rings 28 to the stripper 36 is completely eliminated, in direct contrast to the various systems and apparatus of the prior art.

The submerged purse rings 28 tend to become somewhat more separated, perhaps because of the buoyancy of the water, and it has been found that they are more easily transferred to the stripper 36 in this separated state. In addition to this, there is much less strain on the purse ring handling gear. In the event that any of the netted fish attempt to escape over the submerged purse line, the purse line loop need only be temporarily hoisted just clear of the water.

Although the line 62 can be any suitable line attached to a hoist or the like, it is convenient to use the tow line previously employed to haul in the end of the net during setting of the net. Once the net or seine is set, and the end of the net made fast to the vessel, the tow line can be detached, trained over the block 64, and coupled or shackled to the upper end of the stripper 36 for suspending it in the position illustrated in FIG. 8. The winch associated with the tow line can then be utilized to raise and lower the stripper 36 during the operation of threading the purse rings upon the stripper.

From the foregoing it will be apparent that use of the present stripper and method completely avoids any need to hoist the purse rings high in the air, and eliminates any need to disconnect the purse line from associated equipment such as the pursing drum during collection of the rings on the stripper. The invention requires only that the free extremity of the stripper be flexibly detachably coupled to the purse line in a manner enabling it to be carried through the purse rings for collection of the purse rings upon the stripper.

Various modifications and changes may be made with regard to the foregoing detailed description without departing from the spirit of the invention.

I claim:

1. A purse ring stripper to facilitate stripping a closely grouped plurality of purse rings from a loop of purse line, said purse ring stripper comprising:
    a stripper member including means for freely hanging said stripper member adjacent the loop of purse line and further including an upwardly and outwardly projecting threading portion; and
    flexible coupling means carried at the outer end of said threading portion adapted for detachably coupling said threading portion to the purse line at a point located outwardly of said group of purse rings, said coupling means being movable upon said threading portion for alignment with and passage through said rings upon slacking off of the adjacent portion of the purse line, and consequent movement of said rings downwardly toward said threading portion, whereby said rings are collected upon said stripper member.

2. A purse ring stripper according to claim 1 wherein the configuration and weight balance of said freely hanging stripper member projects said threading portion upwardly at an angle sufficient to retain and support said group of rings upon said stripper member upon removal of said purse line.

3. A purse ring stripper according to claim 1 wherein said stripper member is U-shape in configuration.

4. A purse ring stripper according to claim 1 wherein said coupling means includes a coupler pivoted upon said threading portion, and further includes flexible means carried by said coupler and adapted to be detachably shackled to said purse line loop.

5. In pursing apparatus having means for suspending a loop of purse line with a plurality of purse rings thereon, an improved purse ring stripper for stripping said purse rings from said purse line, said stripper comprising:
   a stripper member having an upwardly and outwardly projecting threading portion;
   flexible means connected to said stripper member and freely hanging said stripper member with said threading portion adjacent said purse line loop; and
   coupling means carried by and flexibly connecting said threading portion to said purse line whereby said threading portion is guidable by said purse line through said purse rings upon slacking off of said purse line loop adjacent said threading portion.

6. Pursing apparatus according to claim 5, wherein said flexible means is a sling fixed at its upper extremity.

7. Pursing apparatus according to claim 5 wherein said flexible means is a line, and said pursing apparatus includes means for slacking off said line to lower said stripper member.

8. A purse ring stripper for stripping a group of purse rings from a loop of purse line suspended from a pair of purse blocks supported by a davit, said purse ring stripper comprising:
   a stripper member having an upwardly and outwardly projecting threading portion;
   a flexible line supported on said davit and connected to said stripper member to support said threading portion adjacent said loop of purse line;
   means attached to the outer end of said threading portion, and movable thereon, for flexibly coupling said threading portion to the purse line at a point outwardly of the end rings of said group of purse rings.

9. A purse ring stripper according to claim 8 and including a block on said davit through which said line is rove, and further including hoisting means coupled to said line for raising and lowering said stripper relative to said davit.

10. The method of stripping a closely grouped plurality of purse rings from a loop of purse line in a purse seining operation, said method comprising:
    suspending a purse ring stripper generally adjacent and below one side of the loop;
    flexibly attaching the ring stripper to the purse line at a point located outwardly of said purse rings;
    slacking off on the ring stripper side of the loop whereby the ring stripper moves into alignment with the purse rings and is carried through the purse rings with the purse line as the purse rings fall onto the ring stripper;
    separating the purse line from the purse rings; and
    supporting the freed purse rings on the ring stripper for later sequential separation therefrom on hauling in of the purse ring seine.

11. The method of claim 10 including the step of lowering the ring stripper substantially simultaneously with said slacking off whereby transfer of the rings downwardly and onto the ring stripper is facilitated.

12. The method of claim 11 wherein the loop of purse line and the lowering of the ring stripper is continued until the purse rings and ring stripper are submerged in the water adjacent the fishing vessel whereby transfer of the rings onto the stripper member takes place partially or wholly under water.

* * * * *